Patented May 1, 1945

2,374,754

UNITED STATES PATENT OFFICE 2,374,754

PROCESS OF PRODUCING STERILIZING AND DISINFECTANT PRODUCTS

Ignaz Kreidl and Werner Kreidl, New York, N. Y., assignors, by mesne assignments, to Synochem Corporation, New York, N. Y., a corporation of New York No Drawing. Application November 21, 1941, Serial No. 419,992

10 Claims. (Cl. 167—14)

The present invention relates to a process for the production of bactericidal, disinfectant, or therapeutically active products. More particularly it relates to raw materials and finished products, such as those prepared from natural or synthetic textile fibers which are suitable as carrier substances.

The primary object of our invention is to render such raw materials and products formed therefrom sterile and bactericidal in character.

It is known that certain products, such as textiles, may be kept sterile by means of reducible silver salts, from which silver has been precipitated by means of metal compounds, the metals of which may occur in several valences, such as by means of manganese, cobalt or cerium compounds. These known processes are based on the fact that silver may be precipitated from its salts in the presence of alkali by means of compounds of the lower valence state of such metals, whereby these compounds are oxidized to the higher valence state of said metals and whereby the silver is obtained in a more or less molecular distribution.

Thus, for example, it is possible to impregnate textiles or other fibrous substances with a silver salt and a reducing agent as described above, in which manner fibrous products and similar materials may be sterilized. However, it is also possible to produce such a sterilizing or disinfectant product as such, for example in the form of a powder or in another solid form.

The present invention is based on the discovery that sterilizing or disinfectant products of greatly improved properties may be obtained by utilizing reducible compounds of oligodynamically active metals, such as compounds of gold, silver and the like, and also from some not noble metals, in combination with metal compounds having at least one organic constituent. The use of soluble metal compounds having organic constituents of reducing character thus offers a means of preparing sterilizing, bactericidal, disinfectant, or therapeutically active products and of introducing oligodynamically active metals in a particularly active form. The method according to the present invention differs principally from the known processes in that the precipitation of the oligodynamically active metal is caused by the organic constituent of a metal compound, said organic constituent being oxidized while the inorganic portion thereof is precipitated in an insoluble form which will be in a more or less molecular mixture with the oligodynamic metal. Metal compounds having at least one organic constituent which are especially suitable for the present invention are the metal salts of strongly reducing organic acids, such as salts of formic acid with aluminum, thorium, zirconium, or the like, all of which will be converted into insoluble metal compounds on reduction of the salt of the oligodynamic salt by means of their organic constituents.

The present invention makes it possible to use the compounds of univalent metals. A special advantage of the process according to the present invention is that the silver or other oligodynamic metals need not be precipitated in the presence of alkali since due to the utilization of the organic constituents of said metal compounds, reduction may be obtained in the absence of alkali. This becomes evident when comparing the process of the present invention with the known processes. Where metal compounds of the lower valence state of metals, such as of manganese, are utilized for reducing silver salts the presence of alkali is absolutely necessary since compounds such as manganous salts are incapable of any reducing action in the presence of acids.

The process of the present invention also enables the use of metal compounds and oxides which have a specially favorable adherence to fibers or other carriers and thereby promote an especially intimate adherence of the oligodynamic metal with the fibrous materials or textiles, or other carriers. The present invention also allows of the use of compounds of zirconium, aluminum, or the like which will be oxidized to uncolored oxides whereby even where silver is used as the oligodynamic metal relatively light colored products may be obtained.

A further advantage of the present invention is that it allows the use of strong organic reducing agents, such as of formic acid, and therefore also the use of complex or insoluble silver salts, or such salts of other oligodynamic metals.

The present invention provides a large variety of metal compounds which may be utilized in the production of sterilizing, bactericidal, and disinfectant products. The process according to the present invention provides means of preparing permanently sterile products such as bandages, absorbent cotton, sponges, bristles, or other carriers for the disinfectant product prepared from natural or synthetic materials.

In carrying out the process according to the present invention it may be advantageous to promote adherence to the carrier material, such as fibrous products, or synthetic materials by pretreating the carrier material with, or by carrying out the impregnation thereof with the oligodynamic product in the presence of wetting agents, or swelling agents and similarly surface active substances. The selection of the swelling or wetting agents will, of course, be dependent on the nature of the carrier material to be impregnated. Thus alcohol and acetone are known to be suitable swelling agents for many synthetic plastics, while for the impregnation of textiles a large variety of wetting agents are available, for example, a wetting agent sold under the trade name of "Aerosol OT" which is a dioctyl ester of sodium sulfosuccinic acid.

In many cases the color of substances which have been treated with oligodynamic metals by means of the process according to the present invention may be improved by an after treatment with soluble electrolytes such as ammonia, ammonium chloride, or especially alkali metal chlorides such as sodium chloride.

The present invention also may be utilized for the production of bactericidal, disinfectant, or therapeutically active products in solid form, for example, in the form of a powder which will consist in the precipitation product resulting from the reaction of a reducible compound of an oligodynamically active metal with a metal compound having an organic constituent capable of a reducing action, the oxidation product of said organic metal compound being an insoluble inorganic metal compound. Such powdery products may be used alone or added to other materials such as to cosmetic powders for use upon the face and body.

Solutions and emulsions or suspensions of such solid products may be also used for disinfectants or the like or for impregnation purposes and the like.

*Example.*—A cotton gauze was impregnated with a saturated aluminum formate solution and then dried. The thus treated gauze was dipped into a ¼% silver acetate solution which was heated to 70° C. The thus obtained gauze which accordingly had an impregnation of aluminum hydroxide and silver possessed bactericidal properties.

What we claim is:

1. The method for the production of sterilized and disinfectant substances which comprises treating a reducible compound of oligodynamically active metal with a soluble metal formate selected from the group consisting of aluminum formate, thorium formate and zirconium formate.

2. The method of sterilizing and disinfecting a carrier substance which comprises treating such carrier substance with a reducible compound of an oligodynamically active metal and with a soluble metal formate selected from the group consisting of aluminum formate, thorium formate and zirconium formate.

3. The method according to claim 2 wherein the carrier substance to be made sterile is first treated with one of the reactants and the so treated substance is then treated with the other of the reactants to produce in situ on the treated substance the reaction product in insoluble form.

4. The method according to claim 2 wherein the carrier substance to be made sterile is first subjected to a pretreatment with an agent selected from the group consisting of wetting agents and swelling agents to promote the impregnation thereof by the reactants.

5. A method according to claim 2 wherein the carrier substance is subjected to an after-treatment with a soluble electrolyte selected from the group consisting of ammonia and the alkaline chlorides.

6. The method according to claim 2 wherein the reaction is carried out upon a fibrous carrier substance.

7. The method according to claim 2 wherein the reaction is carried out upon a pulverulent substance.

8. A new composition of matter for medical, therapeutic, disinfectant and sterilizing purposes consisting of the reaction product of a reducible compound of an oligodynamic metal with a soluble metal formate selected from the group consisting of aluminum formate, thorium formate and zirconium formate.

9. As a new article of manufacture, a sterilized therapeutic and disinfectant article having thereon an insoluble deposit comprising the reaction product of a reducible compound of an oligodynamic metal with a soluble metal formate selected from the group consisting of aluminum formate, thorium formate and zirconium formate.

10. As an article of manufacture, a sterilized therapeutic and disinfectant substance comprising a pulverulent metal having thereon an insoluble deposit comprising the reaction product of a reducible compound of an oligodynamic metal with a soluble metal formate selected from the group consisting of aluminum formate, thorium formate and zirconium formate.

IGNAZ KREIDL.
WERNER KREIDL.